March 5, 1935.  I. W. BROGGER  1,993,540
DIRECTION SIGNAL SYSTEM
Filed May 3, 1933    2 Sheets-Sheet 1
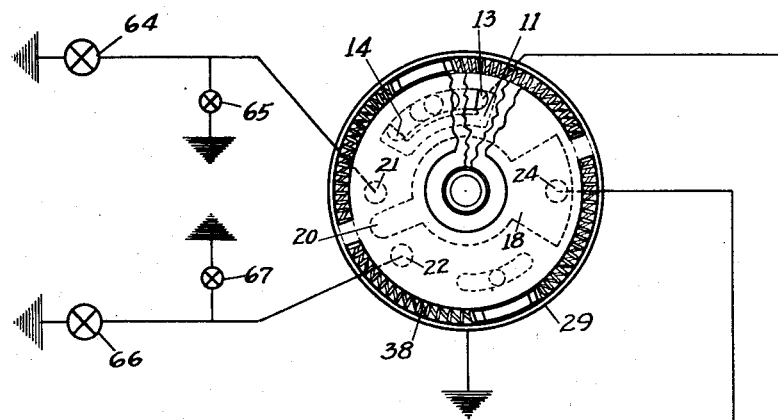
Fig. 1
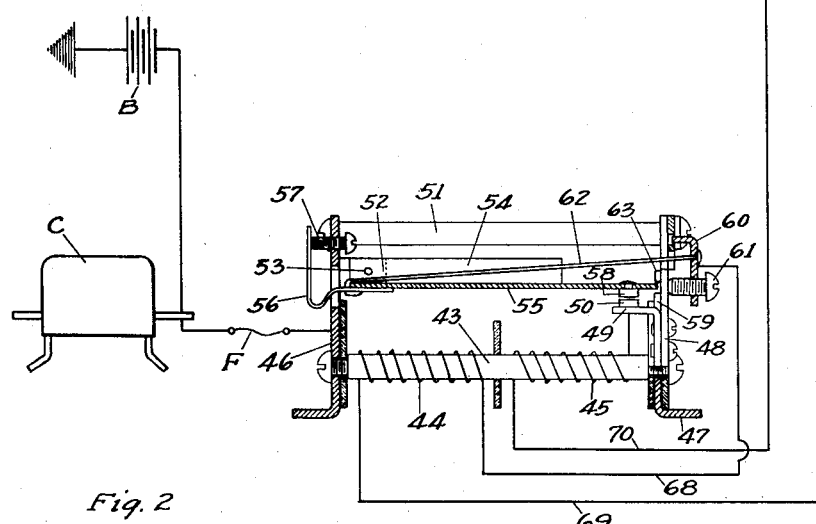
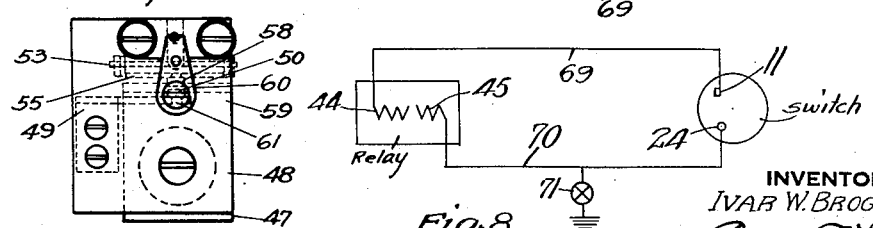
Fig. 2
Fig. 8
INVENTOR
IVAR W. BROGGER
ATTORNEY

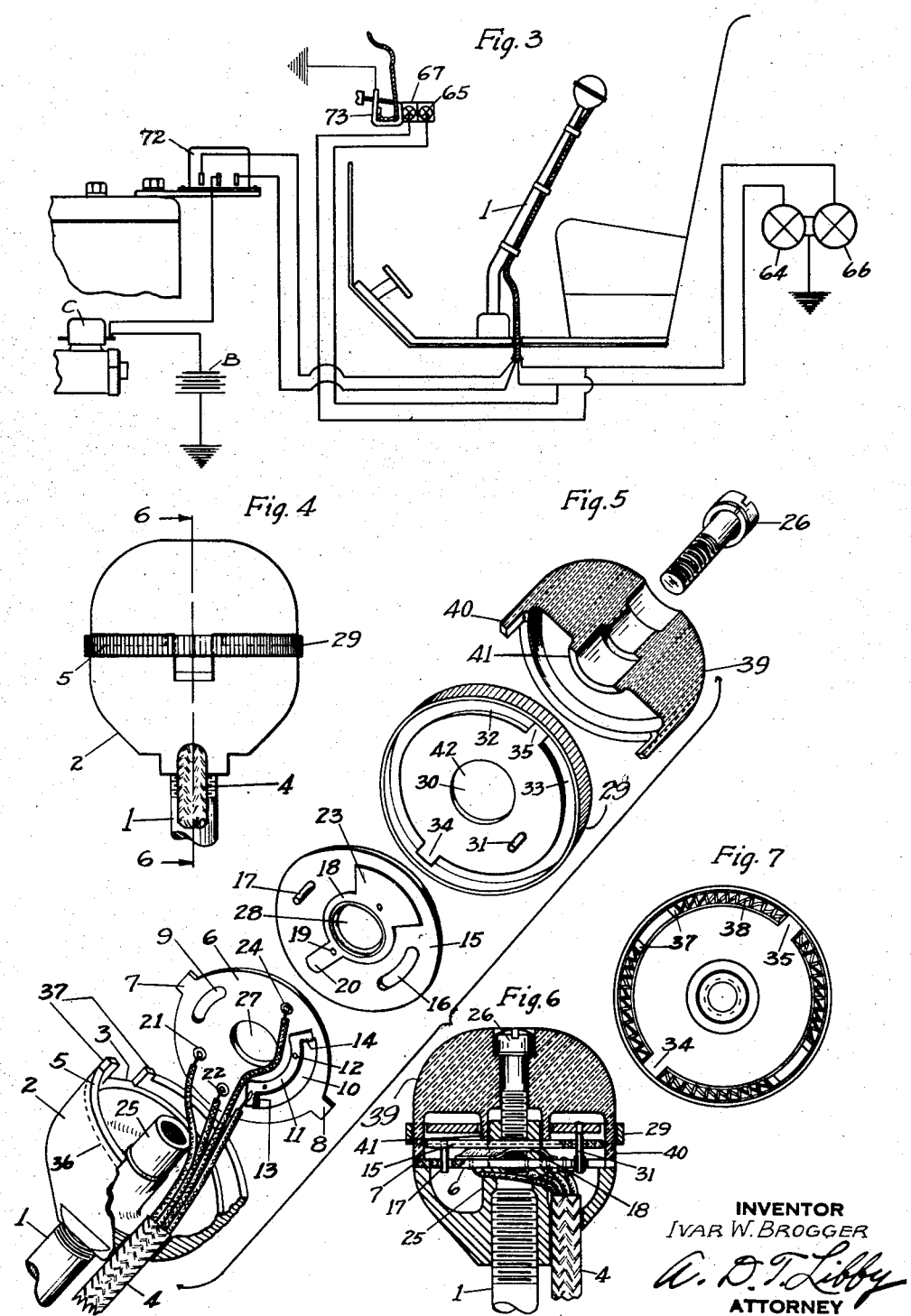

Patented Mar. 5, 1935

1,993,540

UNITED STATES PATENT OFFICE 1,993,540

DIRECTION SIGNAL SYSTEM

Ivar W. Brogger, West Orange, N. J., assignor to Edison-Splitdorf Corporation, West Orange, N. J., a corporation of New Jersey Application May 3, 1933, Serial No. 669,094

15 Claims. (Cl. 177—339)

This invention relates to an apparatus and means for controlling warning or direction signals on an automotive vehicle to indicate the direction in which the driver is going to turn.

Heretofore, various kinds of devices have been proposed for this work, such as illuminated arrows, mechanically moved arrows or hands, as well as right and left-hand signals, but all of these devices have certain objections, so that today the majority of automotive vehicles, particularly as they come from the manufacturer, are not equipped with such devices and the turning directions are left to the driver, with the result that the driver may or may not give any signal with his hand, thereby leaving the driver behind "in the dark" as to the kind of a turn the driver ahead intends to make.

It is one of the objects of my invention to provide, on the rear of the vehicle, right and left-hand turning lamps and a semi-automatic control over these lamps, such that the manual operation to be performed on the part of the driver is reduced to a minimum, which is very important because the crowded condition of the streets requires the full attention of the driver to avoid accidents.

Another object of my invention is to enable the driver to change from one signal to another at will, regardless of the automatic feature of the device.

Another object of my invention is to provide a visual checking means on the operation of the right and left-hand rear-end signals whereby the operator can tell at a glance whether these signals are functioning.

It is another object of my invention to provide a warning or direction indicating signal system which is so arranged that the direction signals themselves will function even though the pilot or driver observation checking means becomes temporarily deranged.

These and other objects will be clear to one skilled in this particular art from a study of the specification taken in connection with the annexed drawings, wherein:

Figure 1 is a diagrammatic arrangement showing the control devices used in my signal system.

Figure 2 is a view of the right-hand end of the relay shown at the bottom of Figure 1.

Figure 3 is a diagrammatic arrangement of the apparatus shown in Figure 1 as applied to an automotive vehicle.

Figure 4 is a view of the special knob which may be used on top of the gearshift lever for the control of the system.

Figure 5 is a detached or expanded view of the control knob shown in Figure 4.

Figure 6 is a section on the line 6—6 of Figure 4.

Figure 7 is a plan view of certain of the members of Figure 5, showing the control springs used in connection therewith.

Figure 8 is a diagrammatical illustration of a modified form of connecting a pilot light in the system.

Referring now to the details, wherein like numbers refer to corresponding parts in the various views, and referring first to the special control knob used on the gearshift lever 1, the parts of which are shown in expanded view in Figure 5; the lever 1 has a cup-shaped member 2 preferably of metal having notches 3, only one of which is indicated, as the opposite side is broken away to show the cable 4 coming through the bottom of the cup 2. The bottom of the notch 3 is below the rim 5 so that the plate 6, made of any suitable strong insulating material, will lie within the rim 5, with the projections 7 and 8 resting in the notches 3.

The insulator 6 is provided with an arcuately formed slot 9 adjacent the projection 7, while on the opposite side of the axial center of the member 6 is a similar but longer slot 10. The insulator 6 carries an arcuately formed metallic segment 11 which is fastened to the plate 6 in any satisfactory manner as by rivets 12, and the slot 10 also has its counter part in the metallic segment 11. At one end of the slot 10, there is a finger 13 upturned from the metallic plate 11, and at the opposite end of the slot 10, another finger 14 upturned from the plate 11. The fingers 13 and 14 act as contact members as will be later pointed out.

Fitting on top of the insulating plate 6 is a second insulating disc 15 having a slot 16 directly over the slot 10 in the plate 6. The disc 15 also carries a stop pin 17 which, in assembled position, is within the slot 9. A contact plate 18 is fastened to the disc 15 in any satisfactory manner as by rivets 19. The member 18 has a contact arm 20 adapted to engage either one of the contacts 21 or 22 carried by the insulating disc 6, while the portion 23 of the contact member 18 is adapted to continuously engage contact 24 on the disc 6.

The cup-shaped member 2 is provided with a centrally located threaded stem 25, one end of which is adapted to be screwed on to the threads on the end of the lever 1, while the other end is threaded to receive a cap-screw 26 to hold all of the parts of the combined control knob and switch together. It will be seen that the disc 6 has a hole 27 which has a fairly close fit over the end of the stem 25. The disc 15 has a hole 28 which fits around the stem 25, but the hole through the member 18 is considerably larger than the hole 28 and concentric therewith, so that as the disc 15 is rotated about the stem 25, the contact member 18 cannot possibly touch the stem 25 for a purpose which will be made clear from the description to follow.

Fitting over the discs 6 and 15, is a ring member 29 which is preferably knurled on the outside so as to provide a grip for the fingers of the driver of the vehicle. The ring member 29 has a hole 30 to fit over the end of the shoulder 41 around which it rotates. The ring 29 carries a contact pin 31 which, when the parts are assembled, operates in the slot 16 of the disc 15, and also extends into the slot 10 of the disc 6. The bottom of the ring member 29 has two arcuate slots 32 and 33 near the peripheral edge of the ring 29 separated by two ribs 34 and 35. The edge of the ring 29 is adapted to fit down over the edge of the rim 5 of the member 2 as indicated by the dotted line 36, and resting on the rim 5 and between the ribs 34 and 35 and lugs 37 on the member 2, are a plurality of springs 38.

Fitting above the ring 29, is a cap 39 preferably of insulating material. The cap 39 has a pair of lugs 40 fitting into the notches 3 on the member 2 and resting on the projections 7 and 8 of the disc 6, thereby holding this disc securely in position when the cap-screw 26 is screwed into position in the end of the stem 25 as has been explained. It may be noted that the member 18 has a certain spring tension when in engagement with the contacts 21, 22, and 24, tending to lift the disc 15 upwardly, but this action is counter-acted by reason of the annular shoulder 41 on the cap 39 passing through the hole 42 in the ring member 29, into engagement with the top part of the disc 15, thereby also reducing the frictional area on the disc 15 to a minimum, whereby the disc 15 may be readily turned by the ring member 29 as has been explained.

The switch mechanism which has just been described, comprises a combination knob and switch for mounting on the gearshift lever 1 and is diagrammatically shown in skeleton form in Figure 1 in circuit combination with a specially designed relay shown at the bottom of Figure 1. This special relay has a core 43 on which are two windings 44 and 45. Attached to one end of the core 43, is a yoke member 46 of magnetic material, and at its opposite end, a second yoke member 47 to which is attached an insulator 48. Fastened to the insulator 48, is a bracket 49 carrying a contact 50.

Between the outer end of the insulator 48 and the yoke member 46, are a pair of tie-rods 51, only one of which is shown in Figure 1. The member 46 has a pair of ears, one of which is shown by the dotted line 52, carrying a pivot pin 53 extending through upturned flanges, only one, 54, of which is indicated, forming a part of an armature 55, whereby the armature is pivoted by the pivot pin 53. Joined to the armature 55 at the pivot end, is a spring 56, the tension of which is regulated by an adjusting screw 57 carried by the yoke member 46. The free end of the armature 55 carries a contact 58 to cooperate with the contact 50.

When the two contacts 50 and 58 are in engagement, there is still a small air gap between the extremity of the armature and the end 59 of the yoke member 47. This air gap can be adjusted by shifting the bracket arm 49 up or down. Movably supported on the upper end of the insulator 48, is a tension arm 60 which carries an adjusting screw 61. Fastened to the tension arm 60, is a wire 62 of very high resistance material which will expand when current is passed therethrough. The other end of this wire is fastened to the pivoted end of the armature 55 in such a manner that when the wire 62 is cold, it is under tension and tends to draw the contact 58 away from the contact 50 and will hold the free end of the armature against a stop 63. Likewise, the tension spring 56 under the control adjustment screw 57 also tends to normally hold the contacts 50 and 58 in separated position.

As will be seen from Figure 1, one end of the winding 44 is connected to the tension arm 60, while the other end is connected to the contact plate 11 of the switch. One end of the winding 45 is connected to the contact arm 49, while the other end is connected to the contact 24 of the switch. The contact 21 is connected to the rear signal light 64, as well as to the guard or pilot light 65 associated therewith. The contact 22 of the switch is connected to the other direction signal 66 and also to the corresponding guard or pilot light 67. As is indicated in Figure 1, the ring member 29 is grounded by reason of its contact with the metallic cup 2 carried on the gearshift lever 1, through ribs 34 and 35, springs 38 and lugs 37, it being understood that the frame of the car is connected to the ground side of the storage battery B and/or charging generator, which is automatically connected to the battery B by the usual cutout C. The yoke member 46 of the relay is connected to the battery B at any suitable place; for example, the tap may be taken off one terminal of the cutout C. Preferably a fuse F is connected in this lead wire.

Coming now to the operation of my system, let it be assumed that all of the circuit connections are made as indicated and described, and that the switch control ring 29 is in its neutral position, in which case the contacts 50 and 58 of the relay will be open. Now, assuming the driver wants to turn in one direction, he engages the ring 29 and turns this in the direction in which he desires to turn the vehicle; for instance, he turns the ring 29 in a certain direction which will move the contact disc 15, whereby the contact member 18 moves so as to close the arm 20 on to the contact member 21. At the same time, the pin 31 will move to the end of the slot 10 to engage the upturned finger 13 on the contact member 11. This completes a circuit from the battery B through the yoke member 46, the resistance wire 62, wire 68, winding 44, wire 69, to the contact 11, through the finger 13 to the pin 31, through the springs 38 and the ring 29 which engages with the metal cup 2, to the gearshift lever 1 connected to the frame of the car, it being understood that the frame of the car is connected to the ground side of the battery B.

This will energize the winding 44 and draw the armature 55 downwardly to close the contacts 58 and 50, thereby completing a circuit from the battery B through the armature, the contacts, winding 45, and conductor 70 to the contact 24 in the switch, through the contact member 18, arm 20, contact 21, and through the direction signal 64, as well as the pilot light or signal 65, thereby giving notice to any one behind the vehicle as to the direction the vehicle is going to be turned, it being understood that this signal is so marked as to give the necessary indication, as well as notify the operator, through his pilot or guard signal 65, that the direction signal circuit is functioning.

It should be noted at this point that the interval of time of closing the contacts 58 and 50 after the energization of the winding 44, is an extremely small one, so that when the operator releases the control ring 29, the winding 45 comes into effect before the return springs 38 can return the ring 29 back to its normal position, because it is to be remembered that as soon as the pin 31 leaves the member 13 as described, the circuit through the winding 44 is broken. The winding 45 then will hold the contacts 50 and 58 closed to give the signal as described, and the time in which these signals are held in operative position is controlled by the time it takes the wire 62 to cool down sufficiently so that its contraction will overcome the magnetic pull due to the winding 45, and this interval of time is controlled by the adjusting screw 61 as well as to some extent by the adjusting screw 57. Therefore, after a control period of time takes place, the armature 55 will be automatically returned to open position; that is to say, the contacts 50 and 58 will be separated and the signals 64 and 65 will go out automatically. The construction of the relay is such that the magnetic actions of the windings 44 and 45 produce a very quick break at the contacts 50 and 58.

It may be noted that the disc 15, carrying the contact member 18, stays in the position in which it is set, for example that just described, until it is moved again by the operator. If the next turn happens to be in the same direction as the one just described, it will stay in the position indicated, but the control of the relay will be through the pin 31 and the contact 13, which are broken, as has been described when the ring 29 has been released by the operator. If the next turning direction should be opposite to that which has been described, the disc 15 will be shifted in reverse direction to correspond with the direction of the turn, and the pin 31 will then contact with the finger 14 and the arm 20 will engage the contact 22 in the switch, and the corresponding signals will be operated as has already been described.

If one of the turning or direction signals, for example 64, becomes broken, burned out, or otherwise disabled, then the guard or pilot light 65 will be set or lighted as long as the pin 31 is held in engagement with the contact finger 13, but as soon as the control ring 29 is released by the operator, it will immediately go out, because the signal 65 operates on a current so small that this current through the winding 45 is not sufficient to hold the relay in position to keep the contacts 50 and 58 closed against the tension of the spring 56. Consequently, the pilot light 65 will go out immediately the operator releases his hand from the control ring 29. Thus he is warned that the signal 64 has become inoperative. On the other hand, of course, it will be seen from what has been said, that if the pilot light 65 becomes inoperative for any reason, this will not prevent the operation of the rear signal 64, and if it does not function, the operator will at once see this and replace the lamp 65 with a new one, it being understood that the current required to light the signal 64 is sufficient to operate the relay.

I have shown somewhat diagrammatically in Figure 8 an alternative arrangement by which a pilot light 71 is connected to lead wire 70 as indicated so as to take the place of the two pilots 65 and 67 but this arrangement is open to the objection that it does not tell the operator directly which one of the direction signals is inoperative.

In Figure 3, I have shown the relay 72 as mounted back of the cowl or part of the engine, while the two pilot lights 65 and 67 are fastened to a bracket 73 adapted to engage the cowl.

It is possible to mount a control switch, constructed the same or differently from that herein described, on the cowl or some part of the vehicle where the driver can reach it, but I have chosen to design a special combination switch and control knob and apply it to the end of the gearshift lever, because that is the handiest and most natural place for the operator's hand to reach; and in fact, in the majority of cases, on making a street corner turn, the operator has to shift gears anyway so that the one movement of the hand performs the two operations; that is to say, the switch is operated to indicate the direction of the turn to be made, and if it is necessary to shift gears, the operator's hand is already on the combination knob to make the shift.

It is obvious that instead of lights, some other type of signal may be used, but because of the simplicity of the same, I prefer to use standard automotive vehicle lamp bulbs mounted in suitable containers which are equipped with characters that are illuminated to indicate the right or left-hand direction of the turn.

It is also to be noted that the pilot lights are connected in parallel with the signal lights, which has great commercial advantage because the pilot lights can be obtained, of a standard voltage, at most any auto retail shop, garage, or gas-filling station; whereas, series-connected lamps would entail the use of special lamps, and besides the rear-end signals should be of much greater candle power than the pilots, which would mean lamps especially balanced as to their operating characteristics.

From what has been said it will be understood that the mechanical details for carrying my invention into practice may be varied over a considerable range, and I therefore do not wish to be unduly limited in the interpretation of the appended claims.

Having thus described my invention, what I claim is:

1. A direction signal system for automotive vehicles including, a rear-end signal to indicate the direction the vehicle is to be turned, a relay having windings thereon, a switch having a stationary contact and a movable member carrying a contact to engage said stationary contact as long as said movable member is held in contact-engaging position to close a circuit to one of said windings to initially operate said relay, means for returning said movable member to neutral position when released, further stationary contacts in the switch, one connected to said signal and another to another winding on said relay, another movable member comprising part of the switch and actuated by the first-mentioned movable switch member for closing a circuit between said last-mentioned stationary switch contacts, an armature for the relay actuated by said first-mentioned one winding for closing a circuit through said another relay winding, and means carried by the relay for passing current to the first-mentioned relay winding, said last-mentioned means including a member for controlling the length of time said signal is operated after the first-mentioned movable switch member has been released, and a source of current for the system.

2. A direction signal system for automotive vehicles as set forth in claim 1, further characterized in that the means for controlling the length of time control of the relay is a thermo element carried by the relay.

3. A direction signal system for automotive vehicles as set forth in claim 1, further characterized in that the means for controlling the length of time control of the relay is a thermo element carried by the relay, comprising a wire of high resistance.

4. A direction signal system for automotive vehicles as set forth in claim 1, further characterized in that said controlling relay parts include a high resistance wire connected in series with said first-mentioned winding, with means for adjusting the action of said wire.

5. A direction signal system for automotive vehicles including, a rear-end signal to indicate the direction the vehicle is to be turned, a relay for controlling the length of time said signal is operated, having an armature and two windings, one for initially operating the relay and the other acting to hold the relay armature in closed position, a contact carried by the armature and a cooperating contact connected to the holding winding, a switch having a plural set of contacts with means for bringing them into engagement, one set of contacts acting to close a circuit through the relay winding which initially operates it, another set of said switch contacts acting to complete a circuit through the relay-holding winding and the signal, means for opening said first-mentioned set of contacts after the switch closing force has been removed, and means carried by the relay for overcoming the effect of the second winding after a predetermined interval, and opening the armature and circuit through the signal, and a source of current for the system.

6. A direction signal system for automotive vehicles including, a rear-end signal to indicate the direction the vehicle is to be turned, a relay for controlling the length of time said signal is operated, having an armature and two windings, one for initially operating the relay and the other acting to hold the relay armature in closed position, a contact carried by the armature and a cooperating contact connected to the holding winding, a switch having a plural set of contacts with means for bringing them into engagement, one set of contacts acting to close a circuit through the relay winding which initially operates it, another set of said switch contacts acting to complete a circuit through the relay-holding winding and the signal, means for opening said first-mentioned set of contacts after the switch closing force has been removed, a high-resistance thermo element in series with the first winding and adjustably positioned to act on said armature to move it to open position against the effect of the second winding to thereby open the circuit through the signal and a source of current for the system.

7. A direction signal system for automotive vehicles including, a rear-end signal to indicate the direction the vehicle is to be turned, a switch mechanism including contact members and a relay for controlling said signal, said relay having two windings, an actuating winding and a holding winding connected to different switch contact members, and the switch mechanism having a member for controlling two different circuits including said two windings, one in each circuit, the actuating winding being in a circuit established directly by said switch mechanism member, the actuating winding serving to move the relay armature to establish a circuit through the armature, the holding winding, certain of said switch contact members, and the signal, means for returning to neutral position said switch mechanism member after the operating force is removed therefrom to open the circuit through the actuating winding and initial current-carrying means acting automatically on the relay armature to move the same to open position against the action of the said holding winding, after a predetermined interval of time, to stop the signal and a source of current for the system.

8. A direction signal system for automotive vehicles as set forth in claim 7, further characterized in that the said switch mechanism member is operated manually either right or left-handed for the turning direction desired, but returns automatically to neutral position after being released, thereby opening only the circuit directly established by it through the relay-actuating-winding, but not before the holding winding is brought into action.

9. A direction signal system for automotive vehicles as set forth in claim 7, further characterized in that the said switch mechanism member is operated manually for the turning direction desired, said switch mechanism member closing directly the circuit through said relay-actuating-winding, and also determining the position of other of the switch parts to complete a circuit through said holding winding and the signal, said manually operated switch mechanism member returning automatically to neutral position after being released, thereby opening only the circuit directly established by it through the relay-actuating-winding, but not before the holding winding is brought into action.

10. A direction signal system for automotive vehicles as set forth in claim 7, further characterized in that a pilot signal, in view of the operator, is operated simultaneously with the rear signal, said pilot signal being connected in parallel with said rear signal but taking current so small that the said relay holding winding will not hold the relay in closed position should the circuit through the rear signal be inoperative.

11. A direction signal system for automotive vehicles including, a rear-end signal to indicate the direction the vehicle is to be turned, a switch having an outer member adapted to be rotated about its own axis and a switching member and switch contacts within the switch to control a plurality of circuits operated by said outer member, a relay having an armature controlling contacts in the signal circuit and a plurality of windings, one winding energized by the direct movement of said outer rotatable member to close one circuit at the switch to actuate the armature, said winding being deenergized when the operating force is removed from said rotatable member and the other winding energized by current passing through the armature-controlled contacts and certain other of said switching contacts within the switch, and thence through the signal, and initial current-carrying means for opening the said armature-controlled contacts after a predetermined interval of time.

12. A direction signal system for automotive vehicles as set forth in claim 11, further characterized in that the relay armature is controlled by a wire fastened to parts of said relay and connected in circuit with the first-mentioned relay winding, and changing its tension according to the current flowing therethrough.

13. A direction signal system for automotive vehicles including a rear-end signal to indicate the direction the vehicle is to be turned, a switch mechanism including switch contact members, a relay having an actuating winding connected in a circuit comprising part of said switch mechanism and a holding winding, a part on the exterior of said switch being movable to preset said switching members within the switch and to close a circuit through certain of said switch-contact members, bring said relay-actuating winding into action and also to close a separate circuit through contacts on the relay, the holding winding and said other preset switching members within the switch and the signal; means for returning said part on the exterior of the switch to normal position after the operating force is removed to open the circuit through the actuating winding, and initial current-carrying means on the relay for automatically opening the signal circuit after a predetermined interval of time.

14. A direction signal system for automotive vehicles as set forth in claim 13, further characterized in that a pilot signal, connected in parallel with the rear signal, is set before the operator simultaneously with the rear signal, the current through the pilot being insufficient to maintain the relay closed through the holding winding should the rear signal circuit be disabled.

15. A direction signal system for automotive vehicles as set forth in claim 13, further characterized in that means are provided for automatically returning said exterior part on the knob to neutral position after being released without moving the said preset switching members.

IVAR W. BROGGER.